United States Patent
Pardo

(10) Patent No.: US 7,424,496 B1
(45) Date of Patent: Sep. 9, 2008

(54) ASYMMETRIC COHERENCY PROTECTION

(75) Inventor: Ilan Pardo, Ramat Hasharon (IL)

(73) Assignee: Applied Micro Circuits Corporation, San Diego, CA (US)

( * ) Notice: Subject to any disclaimer, the term of this patent is extended or adjusted under 35 U.S.C. 154(b) by 613 days.

(21) Appl. No.: 10/103,415

(22) Filed: Mar. 20, 2002

(51) Int. Cl.
*G06F 17/30* (2006.01)

(52) U.S. Cl. .............. 707/204; 707/101; 707/201; 709/226

(58) Field of Classification Search .......... 707/2, 707/8, 103 B, 200–204, 101; 709/225, 226; 711/141–143
See application file for complete search history.

(56) References Cited

U.S. PATENT DOCUMENTS

| | | | | |
|---|---|---|---|---|
| 5,261,089 A | * | 11/1993 | Coleman et al. ............ | 707/8 |
| 5,452,445 A | * | 9/1995 | Hallmark et al. ............ | 707/2 |
| 5,469,575 A | * | 11/1995 | Madduri .................... | 709/226 |
| 5,553,240 A | * | 9/1996 | Madduri .................... | 709/225 |
| 5,557,792 A | * | 9/1996 | Josten et al. ................. | 707/8 |
| 5,758,347 A | * | 5/1998 | Lo et al. .................. | 707/103 R |
| 5,793,382 A | * | 8/1998 | Yerazunis et al. ........... | 345/474 |
| 5,832,484 A | * | 11/1998 | Sankaran et al. ............ | 707/8 |
| 5,943,676 A | * | 8/1999 | Boothby .................... | 707/201 |
| 6,249,714 B1 | * | 6/2001 | Hocaoglu et al. ............ | 700/97 |
| 6,260,068 B1 | * | 7/2001 | Zalewski et al. ............ | 709/226 |
| 6,389,468 B1 | * | 5/2002 | Muller et al. ............... | 709/226 |
| 6,449,614 B1 | * | 9/2002 | Marcotte .................... | 707/8 |
| 6,567,928 B1 | * | 5/2003 | Lyle et al. .................. | 714/15 |
| 6,606,301 B1 | * | 8/2003 | Muller et al. ............... | 370/230 |
| 6,650,640 B1 | * | 11/2003 | Muller et al. ............... | 370/392 |
| 6,820,088 B1 | * | 11/2004 | Hind et al. .................. | 707/101 |
| 6,865,637 B1 | * | 3/2005 | Linares et al. ............. | 710/305 |
| 2004/0024795 A1 | * | 2/2004 | Hind et al. .................. | 707/204 |
| 2005/0071358 A1 | * | 3/2005 | Hind et al. .................. | 707/101 |

* cited by examiner

*Primary Examiner*—Jean M Corrielus
(74) *Attorney, Agent, or Firm*—Michael Shenker; MacPherson Kwok Chen & Heid LLP

(57) ABSTRACT

Prior to updating a database entry, an update task invalidates a valid indicator (e.g., a bit) associated with the database entry. The update task waits for any other tasks (e.g., user tasks) that are accessing the database entry to complete their processing. In particular, a synchronization register holds a synchronization entry (e.g., a bit) for each user task that is created by a micro controller. The update task sets each synchronization entry of the synchronization register to a first value. As each user task completes its processing, the synchronization entry associated with the user task in the synchronization register is set to a second value (e.g., the synchronization bit is reset). The update task monitors the synchronization register, and, when each synchronization entry has been set to the second value, the update task performs its update of the database entry.

16 Claims, 8 Drawing Sheets

ASYMMETRIC COHERENCY PROTECTION

CROSS REFERENCE TO ATTACHED APPENDIX

Appendix A contains the following files in one CD-ROM (of which two identical copies are attached hereto), and is a part of the present disclosure and is incorporated by reference herein in its entirety:

Volume in drive D is 020320_1057

Volume Serial Number is D3B2-8E3C

Directory of D: \

| 03/20/02 | 10:57a | | <DIR> | . | |
|---|---|---|---|---|---|
| 03/20/02 | 10:57a | | <DIR> | .. | |
| 03/19/02 | 02:52p | | | | 11,232 tdrt.v |
| | | 3 File(s) | | | 11,232 bytes |
| Total Files Listed: | | | | | |
| | | 3 File(s) | | | 11,232 bytes |
| | | | | | 0 bytes free |

The files of Appendix A form source code of computer programs and related data of an illustrative embodiment of the present invention.

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND

A micro controller is a processor on a microchip that performs, for example, arithmetic and logic operations. A micro controller creates one or more tasks, and each task performs a set of instructions. For example, one task may update an entry in a database.

In typical network processing applications, different tasks often access the same database. In some cases, there are multiple time critical tasks (referred to herein as "user tasks") that need to access the database to read data. The time critical tasks may be, for example, tasks that perform packet processing. The term "packet" refers to a unit of data.

On the other hand, the data in the database may not be updated as often as it is read. Therefore, there may be one or a few non time-critical tasks that update the database from time to time (referred to herein as "update tasks").

To avoid one task reading a database entry while another task is updating the same database entry, user and update tasks are not allowed to access the database in parallel. Currently, semaphore mechanisms may be used to allow one task at a time to access a database. A semaphore may be, for example, a bit that is set to a first pre-determined value to indicate that a task has "taken the semaphore" and is accessing the database. The bit may be set to a second pre-determined value to indicate that a task has "released the semaphore" and is no longer accessing the database.

Therefore, when a task wishes to access the database, the task checks the value of the semaphore. If the semaphore has not been taken by another task, the checking task updates the value of the semaphore to indicate that it is accessing the database (i.e., takes the semaphore). Once the task has completed its access, the task resets the value of the semaphore to indicate that it is no longer accessing the database (i.e., releases the semaphore). Thus, a task may check the value of the semaphore to determine whether another task is accessing the database.

Semaphore mechanisms are symmetric in the sense that both the task that is reading data (e.g., a user task) and the task that is updating the database share the overhead of semaphore maintenance. In particular, each type of task must check the value of the semaphore to determine whether another task is accessing the database, and, if the semaphore is available, the task must set the value of the semaphore to prevent other tasks from doing so, and reset the value of the semaphore to let other tasks use the semaphore to access the database.

Typically, there are multiple user tasks that need access to the database. When a task has taken the semaphore, the task prevents other tasks from accessing the database until the semaphore is released. This leads to poor performance for network processing applications.

SUMMARY

In accordance with some embodiments of the invention, prior to updating a database entry, an update task invalidates a valid indicator (e.g., a bit) associated with the database entry. The update task waits for any other tasks (e.g., user tasks) that are accessing the database entry to complete their processing. In particular, a synchronization register holds a synchronization entry (e.g., a bit) for each user task that is created by a micro controller. The update task sets each synchronization entry of the synchronization register to a first value. As each user task completes its processing, the synchronization entry associated with the user task in the synchronization register is set to a second value (e.g., the synchronization bit is reset). The update task monitors the synchronization register, and, when each synchronization entry has been set to the second value, the update task performs its update of the database entry.

In accordance with other embodiments of the invention, the update task performs its update of a database entry when one or more user tasks do not set their associated synchronization entries with the second value. In particular, each user task typically has its associated synchronization entry set to the second value after completing processing of a packet. Some user tasks, however, rather than processing packets, perform background tasks and so do not have their associated synchronization entries reset. The update task is aware of the tasks that do not have their synchronization entries set to the second value and performs its update when all other user tasks have their associated synchronization entries set to the second value. Thus, the update task may perform its update when fewer than all synchronization entries have been set to the second value in the synchronization register.

BRIEF DESCRIPTION OF THE DRAWINGS

Use of the same reference symbols in different figures indicates similar or identical items.

DETAILED DESCRIPTION

In accordance with some embodiments of the invention, prior to updating a database entry, an update task invalidates a valid indicator (e.g., bit) associated with the database entry. The update task waits for any other tasks (e.g., user tasks) that are accessing the database entry to complete their processing. In particular, a synchronization register holds a synchronization entry (e.g., a bit) for each user task that is created by a micro controller. The update task sets each synchronization entry of the synchronization register to a first value. As each user task completes its processing, the synchronization entry associated with the user task in the synchronization register is set to a second value (e.g., the bit is reset). The update task monitors the synchronization register, and, when each synchronization entry has been set to the second value, the update task performs its update.

In accordance with other embodiments of the invention, the update task performs its update of a database entry when one or more user tasks do not set their associated synchronization entries with the second value. In particular, each user task typically has its associated synchronization entry set to the second value after completing processing of a packet. Some user tasks, however, rather than processing packets, perform background tasks and so do not have their associated synchronization entries reset. The update task is aware of the tasks that do not have their synchronization entries set to the second value and performs its update when all other user tasks have their associated synchronization entries set to the second value. Thus, the update task may perform its update when fewer than all synchronization entries have been set to the second value in the synchronization register.

The update technique of some embodiments of the invention allows coherent database update, such that synchronization overhead is performed only by non time-critical database update tasks. No synchronization overhead is performed by time critical user tasks. User tasks may access the same database entry simultaneously without any interference.

Figure 1:
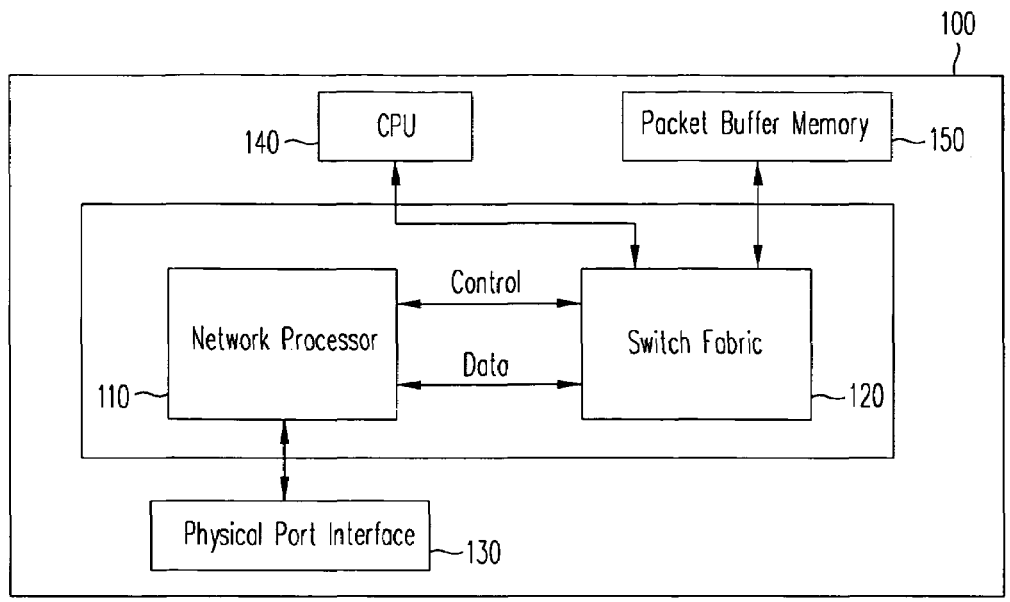
FIG. 1 illustrates, in a block diagram, an architecture in accordance with some embodiments of the invention.

FIG. 1 illustrates, in a block diagram, an architecture 100 in accordance with some embodiments of the invention. The architecture 100 includes a network processor 110 connected to a switch fabric 120. The network processor 110 contains one or more micro controllers (also referred to as "nPcores") and performs various transformations on the packet data as it enters or leaves the switch fabric 120. The switch fabric 120 refers to a combination of hardware and software that moves data coming in to the network processor 110 and out by the correct port. The switch fabric 120 includes switching units, integrated circuits that they contain, and the programming that allows switching paths to be controlled. The switch fabric 120 also manages an external packet buffer memory 150, in which packet data resides while it is within the switch fabric 120.

The overall process by which packets move from the physical port interface 130 to the packet buffer memory 150 is referred to as "ingress." The overall process by which packets move from the packet buffer memory 150 to the physical port interface 130 is referred to as "egress." The physical port interface 130 includes media access controllers.

The CPU interface 140 is connected to the switch fabric 120. The CPU interface 140 supports switch management functions, such as initialization and connection set up when a computer is started. The CPU interface 140 also enables micro controller program download to the network processor 110 during a boot process (when the computer is started or rebooted). During operation of the computer, after the boot process has completed, the CPU interface 140 also allows applets to be downloaded to the network processor 110. Control commands and data packets are routed between the network processor 110 and the switch fabric 120.

Figure 2A:
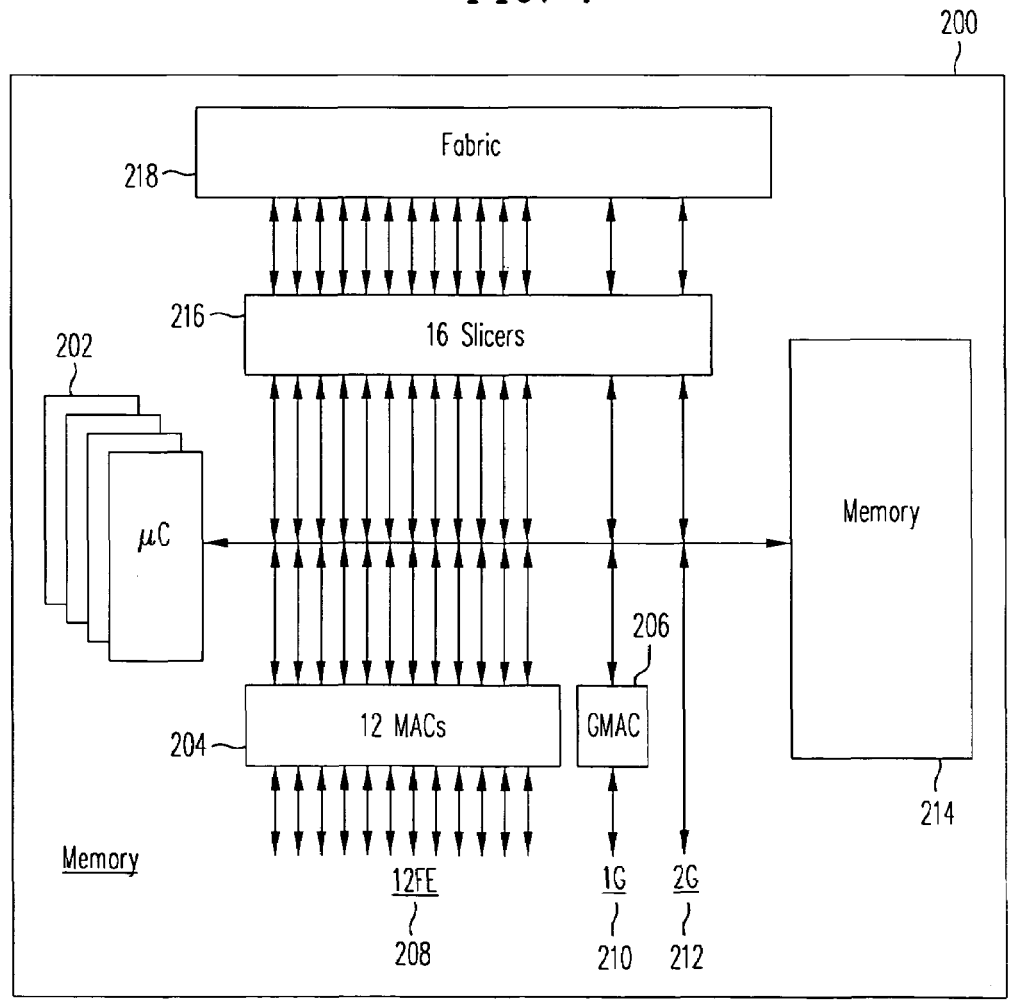
FIG. 2A illustrates, in a block diagram, an internal structure of a port interface in accordance with some embodiments of the invention.

FIG. 2A illustrates, in a block diagram, an internal structure of a port interface in accordance with some embodiments of the invention. The port interface includes micro controllers that are in the network processor 110, a switch fabric 120, and details of the physical port interface 130. A port is a location on a computer at which other devices (e.g., a printer or a facsimile machine) may be connected to the computer.

Memory 200 includes micro controllers 202 (labeled "µC"). Each micro controller 202 is a special purpose central processing unit. The micro controllers 202 reside in the network processor 110 and execute programs to control the operation of all of the internal blocks in memory 200. In particular, the micro controllers 202 generate tasks to execute instructions. The micro controller 202 may access external memory. Additionally, tasks executed by the micro controller 202 may modify or replace the header of a packet, which includes data describing, for example, where a packet should be routed and a class of service for the packet.

The memory also includes 12 media access controllers 204 that are used to connect to 12 fast ethernet ports 208, a gigabit media access controller 208 that is used to connect to one gigabit ethernet port 210, and a two gigabit stack port 212. The micro controllers 202 service all ports based on assignment of micro controllers to ports. In particular, as a packet is received from a port, the packet is stored in a First In First Out queue (FIFO) queue. As tasks become available, they are assigned to process packets from the ports. As each task is associated with a micro controller 202, assignment of tasks to packets also assigns micro controllers 202 to those packets, and thus to the ports from which the packets arrived.

A portion of memory 200 constitutes memory 214. In some embodiments, a synchronization register and a database may be stored in memory 214. In some embodiments, the synchronization register and/or the database may be stored in other memory.

The memory 200 includes 16 slicers 216. The slicers 216 are used to send data to and from the fabric 218. The slicers 216 include an ingress portion and an egress portion. The ingress portion divides packets (also referred to as "frames") that are received from ports into cells, attaches an appropriate tag to each cell to identify the packet with which the cell is associated, and forwards the cells to the fabric 218. The egress portion combines cells received from the fabric 218 to form an ethernet frame (i.e. one type of frame).

Figure 2B:
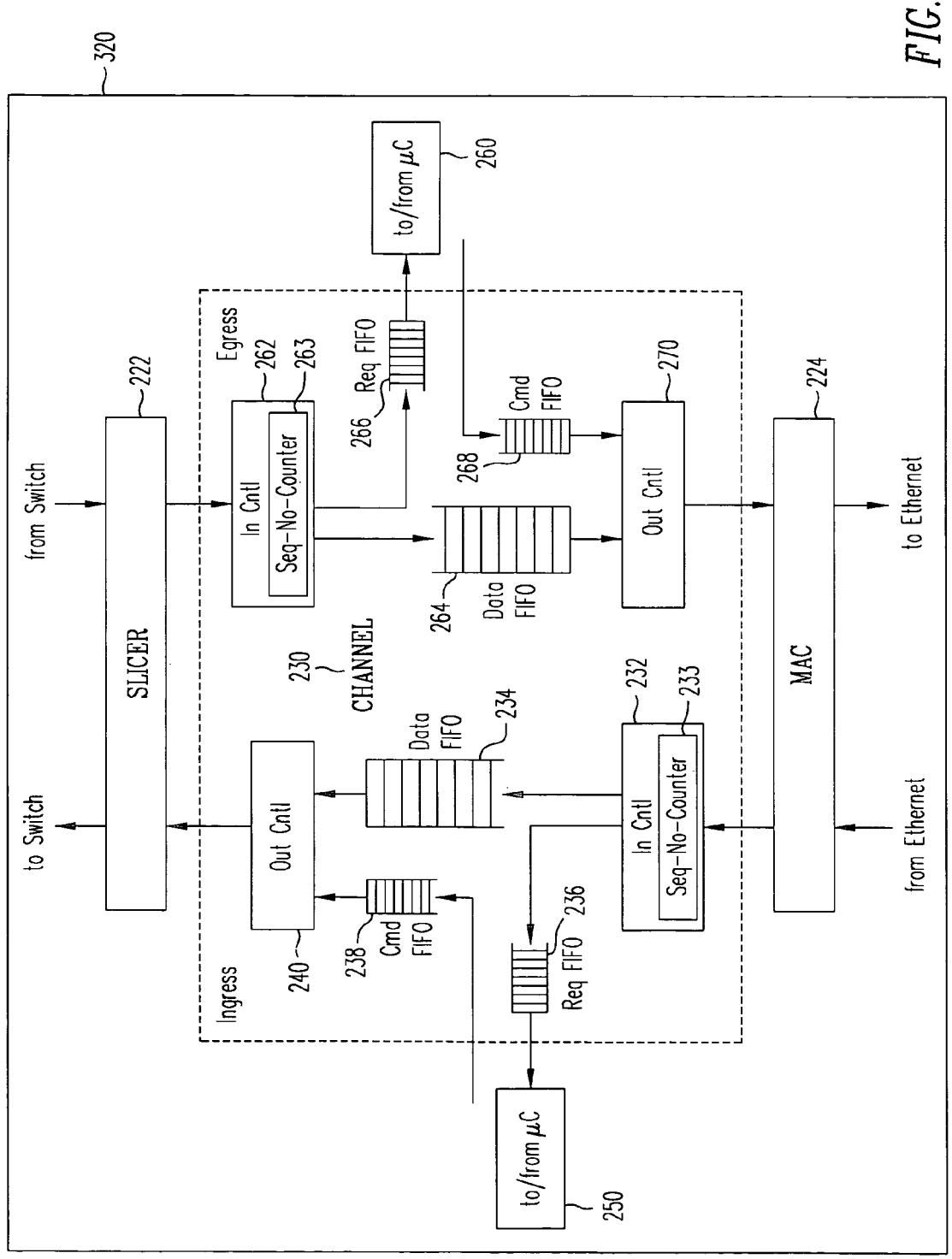
FIG. 2B illustrates, in a block diagram a logical model of a port in accordance with some embodiments of the invention.

FIG. 2B illustrates, in a block diagram a logical model of a port in accordance with some embodiments of the invention. The logical model of the port 220 includes a slicer 222, which receives packets from a switch and sends packets to a switch. A media access control (MAC) 224 serves as an interface to and from an Ethernet. A channel 230 offers a bidirectional data path from the switch fabric to the MAC. In particular, the channel 230 consists of two unidirectional data paths, one for ingress and one for egress. The term "lane" will be used herein to indicate either the ingress or egress data path of a channel.

For ingress, a packet (e.g., an Ethernet frame) arrives from the Ethernet to the MAC 224. The packet is transferred to the input control 232, which stores the packet into a data FIFO 234. The input control 232 includes a sequence number counter 233, which is used to generate a packet sequence number to be assigned to the packet. The term "packet sequence number" refers to a number that is sequentially increasing (or decreasing in some embodiments) to indicate the order in which packets are received at a port. In some embodiments, the sequence number counter 233 is a register that holds a sequence number (initialized to zeros) which is assigned to a packet and incremented before the next packet is assigned a sequence number. The input control 232 also writes a request into a request FIFO 236 to notify a micro controller 250 to process the packet of data. The request FIFO 236 includes one entry for each packet that is received. The micro controller 250 reads the request FIFO 236 and reads the header of a packet in the data FIFO 234. The micro controller 250 creates a task to process the packet, and the task stores commands that describe how the packet is to be transferred into a command FIFO 238.

The output control 240 reads and executes commands from the command FIFO 238 that were issued by tasks of the micro controller 250. Several commands may be related to the same packet. By executing these commands, the output control 240 transfers data inside the command to the slicer 222 and transfers data from the data FIFO 234 to the slicer 222. The slicer 222 forwards the packet to the switch.

The micro controller 250 interfaces with the channel 230 through the request FIFO 236 and command FIFO 238. When data is written into the request FIFO 236, the micro controller 250 is sent an indication that there is a new request pending. The command FIFO 238 is divided into several portions, allowing several tasks to write to the command FIFO 238 simultaneously. When the command FIFO 238 is full, the channel 230 sends an indication to the micro controller 250 to prevent the micro controller 250 from writing another command. The micro controller 250 also has direct access to the data FIFO 234, where packets are stored.

For egress, a packet arrives from the switch to the slicer 222. The packet is transferred to the input control 262, which stores the packet into a data FIFO 264. The input control 262 also includes a sequence number counter 263, which is used to assign sequence numbers to packets. The input control 262 also writes a request into a request FIFO 266 to notify a micro controller 260 to process the packet of data. The request FIFO 266 includes one entry for each packet that is received. The micro controller 260 reads the request FIFO 266 and reads the header of a packet in the data FIFO 264. The micro controller 260 creates a task to process the packet, and the task stores commands that describe how the packet is to be transferred into a command FIFO 268. The output control 270 reads and executes commands from the command FIFO 238 that were issued by tasks of the micro controller 260. Several commands may be related to the same packet. By executing these commands, the output control 270 transfers data inside the command to the MAC 224 and transfers a packet from the data FIFO 264 to the MAC 224. The MAC 224 forwards the packet to the Ethernet.

FIGS. 3A-3E illustrate, in a block diagram, further details of memory 150 in accordance with some embodiments of the invention. The memory 150 includes a synchronization register 300 and a database table 350. The synchronization register has a synchronization bit 310$n$ (where n=A, B, C, etc.) for each time critical user task that may be created by a micro controller 202. The ellipses in the synchronization register 300 indicate that there are additional synchronization bits that are not explicitly illustrated. Although one synchronization register 300 is illustrated, there may be multiple synchronization registers, each associated with a different micro controller. The database 350 includes multiple database entries 352, 354, 356, and 358 (also referred to "rows"). The synchronization register 300 is used to synchronize access to shared database tables. The synchronization register 300 is a read/write register.

The database 350 also includes multiple columns, with one column 360 holding a valid indicator, such as a valid bit, that indicates whether the associated database entry may be accessed. The valid bit may be set to indicate that a database entry is invalid (e.g., the database entry is empty). Before any task accesses a database entry, the task checks the valid bit.

Figure 3A:
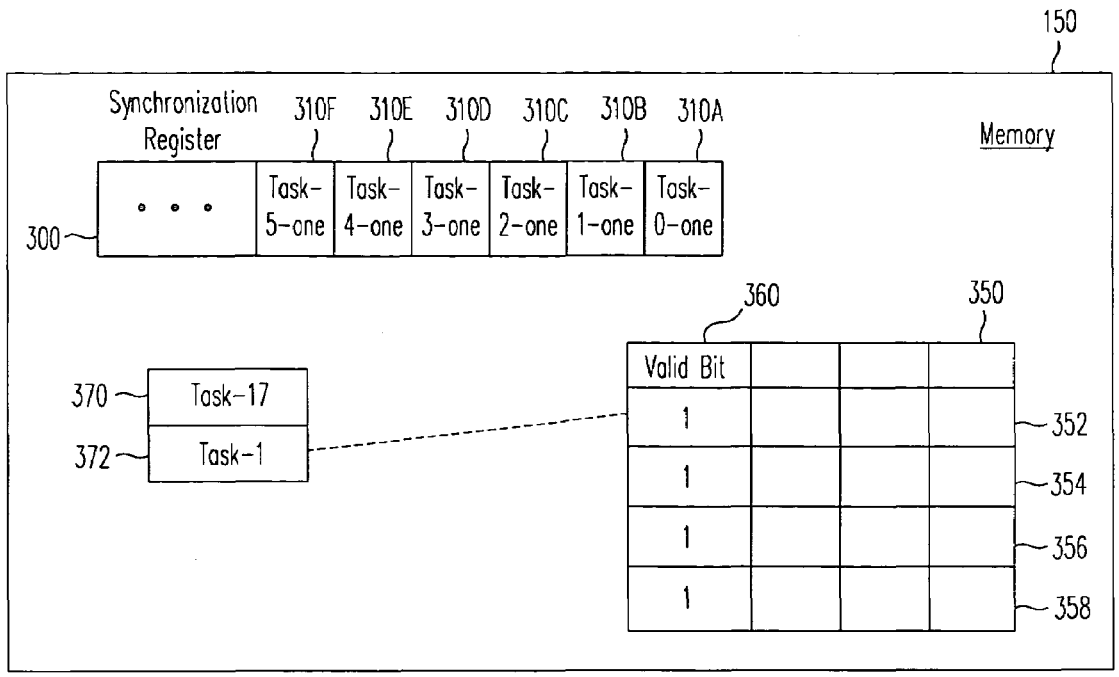
FIGS. 3A-3E illustrate, in a block diagram, further details of memory in accordance with some embodiments of the invention.
Figure 3B:
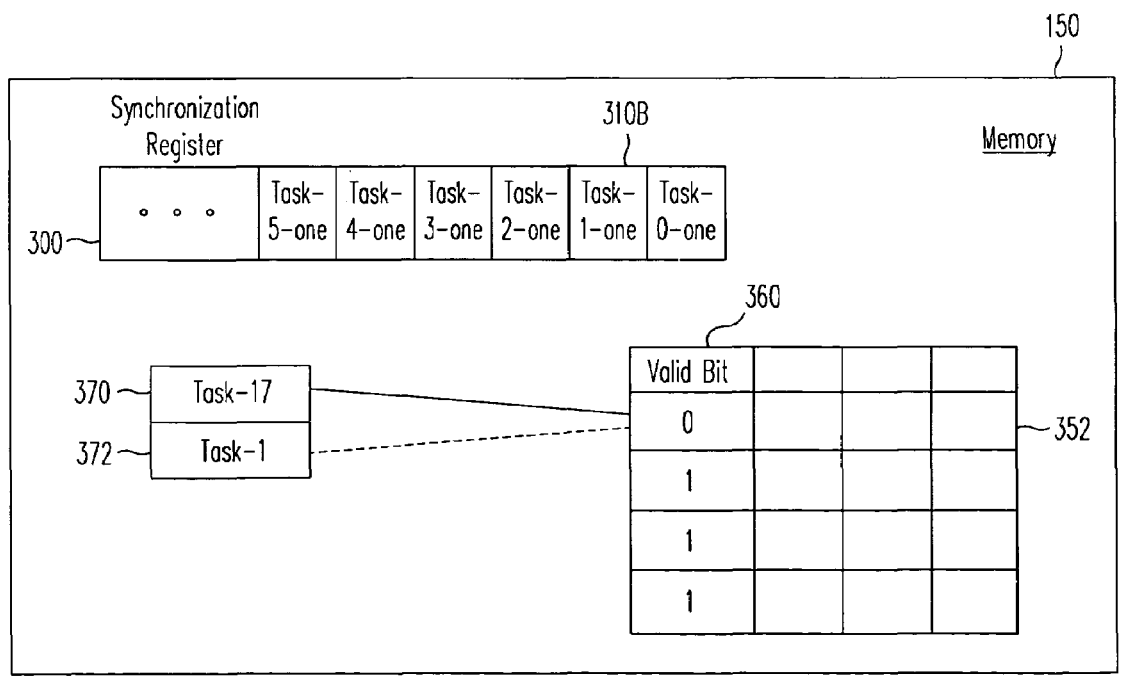
Figure 3C:
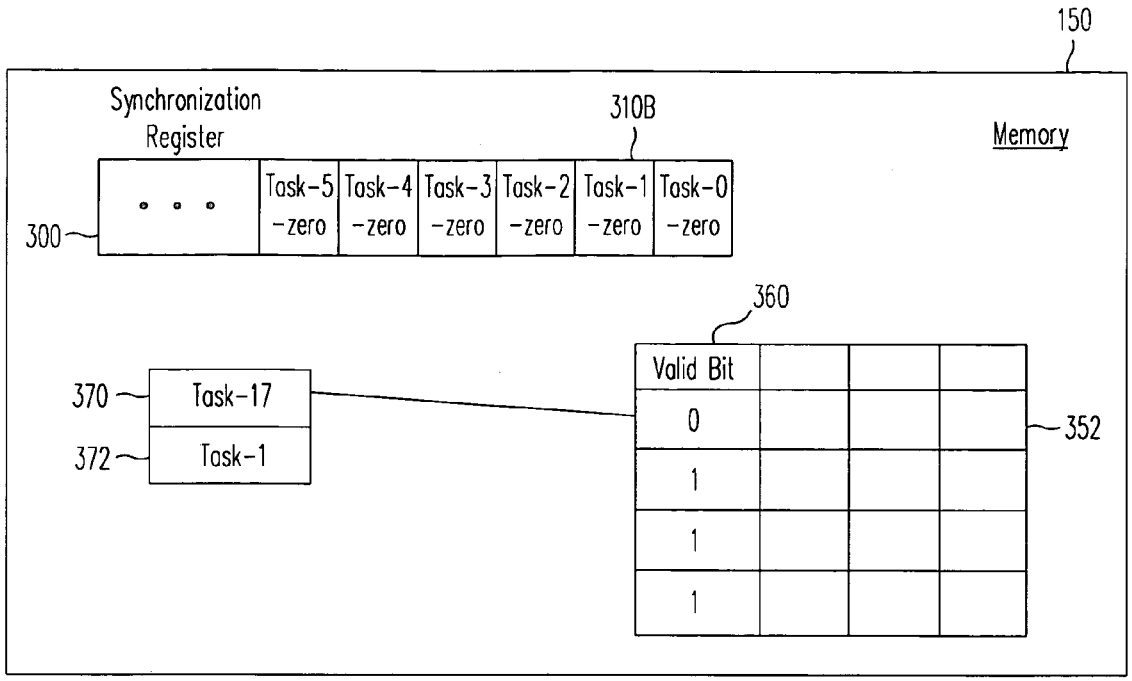
Figure 3D:
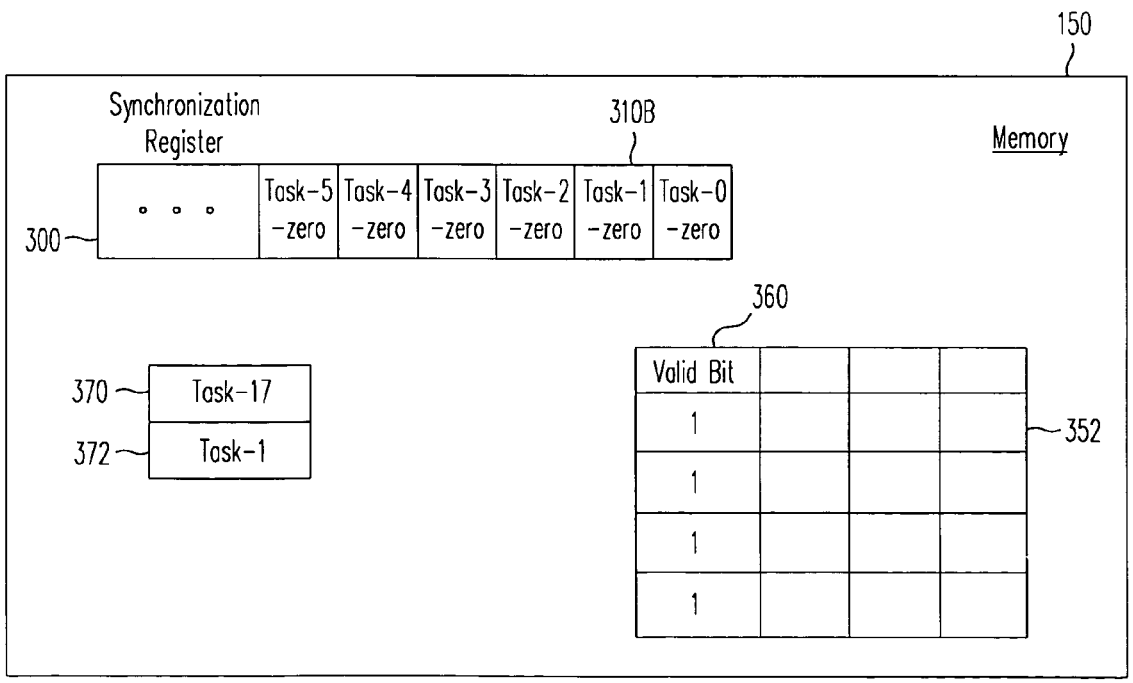
Figure 3E:
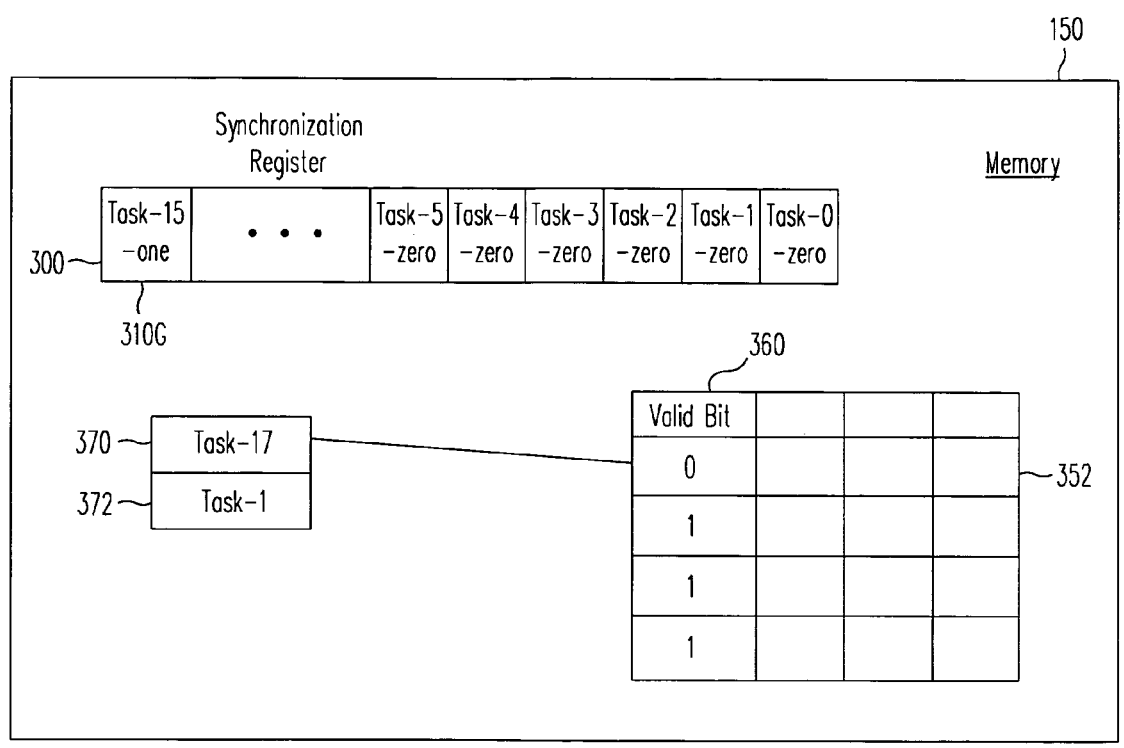

In some embodiments, when the valid bit for a database entry is set to zero by a first task, other tasks are not able to access that database entry, and, when the valid bit is set to one, tasks may access the database entry. In FIG. 3A, for example, database entry 352 has a valid bit set to one, indicating that any task can access that database entry. For example, Task-1 372 is reading database entry 352. Merely for ease of illustration, a dashed line is drawn from Task-1 372 to database entry 352 to indicate that Task-1 372 is reading database entry 352.

Figure 4:
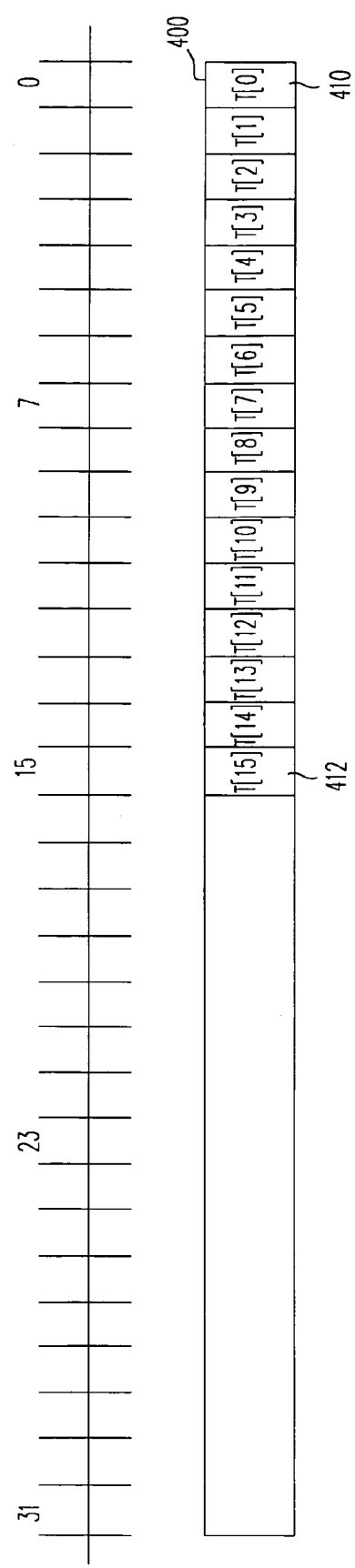
FIG. 4 illustrates, in a block diagram, further details of a synchronization register, in accordance with some embodiments of the invention.

FIG. 4 illustrates, in a block diagram, further details of a synchronization register 400, in accordance with some embodiments of the invention. The synchronization register 400 includes synchronization bits for 32 tasks, but, in some embodiments, utilizes 16 bits for 16 tasks (e.g., Task-0 410 through Task-15 412).

Figure 5:
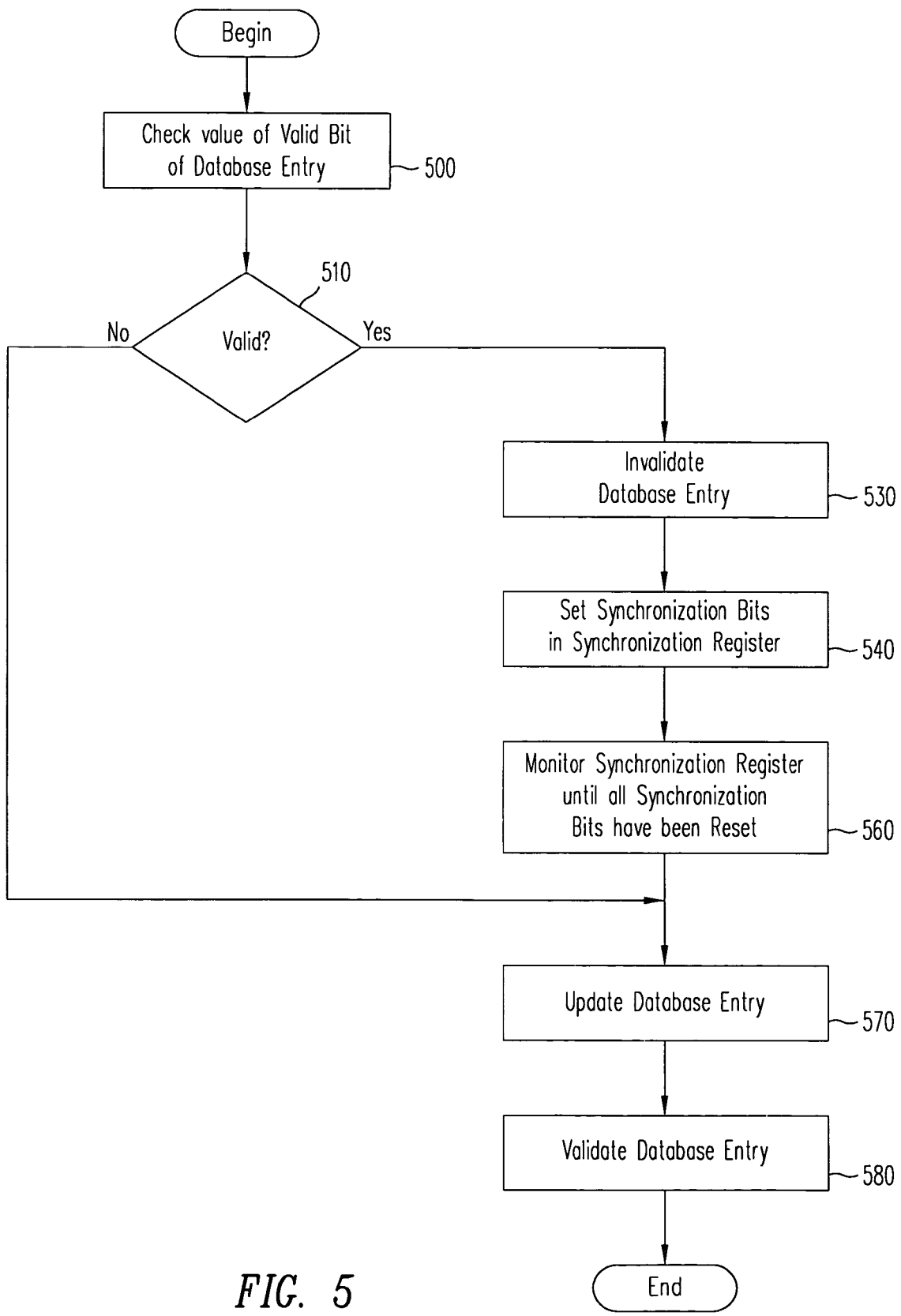
FIG. 5 illustrates, in a flow chart, acts performed by a computer programmed in accordance with some embodiments of the invention to perform database update.

FIG. 5 illustrates, in a flow chart, acts performed by a computer programmed in accordance with some embodiments of the invention to perform database update. The task wishing to update the database will be referred to herein as an "update task." In some embodiments, one task is a non-time critical task that performs all updates. In other embodiments, any task may perform updates. In some embodiments, each task has its own synchronization register.

Act 500 represents a task checking the value of a valid bit of a database entry. For example, Task-17 370 may be a non-time critical update task that wishes to update database entry 352. Before doing so, Task-17 370 checks the value of the valid bit for database entry 352. If the valid bit indicates that the database entry is valid (e.g., valid bit is set to one) (act 510), then processing continues to act 530, otherwise, processing continues to act 570.

If the value of the valid bit is valid (e.g., set to one), the update task invalidates the database entry (act 530) by setting the valid bit to, for example, zero. For example, in FIG. 3B, Task-17 370 sets the valid bit of database entry 352 to zero. Merely for ease of illustration, a solid line is drawn from Task-17 370 to database entry 352 to indicate that Task-17 370 wishes to update database entry 352. At this time, Task-1 372 is still reading database entry 352. With some embodiments of the invention, Task-17 370 does not update database entry 352 until Task-1 372 has completed its access.

The update task also sets the synchronization bits in the synchronization register to, for example, one (act 540). For example, Task-17 370 has set all synchronization bits in synchronization register 300 to one in FIG. 3B. In some embodiments, the update task writes "0xFFFFFFFF" to the synchronization register 300.

Each synchronization bit is negated when a time critical task is, for example, waiting to be assigned to process another packet or when it terminates current processing (and may be reactivated for a new assignment). For example, as each time critical user task completes its processing, the user task may request another packet to process. Upon a user task's request for a packet, the user task's associated synchronization bit is reset in the synchronization register 300. This is done because a user task that read a database entry to process one packet is unlikely to use that same information to process another packet. For example, in FIG. 3C, Task-1 372 has completed reading database entry 352. Task-1 372 then requested another packet for processing, and its associated synchronization bit 310B was set to zero. In this example, the synchronization register 300 holds synchronization bits only for user tasks, and, the synchronization bits for all tasks are set to zero. That is, Task-17 370 allows any tasks that were accessing database entry 352 at the time Task-17 370 was invalidating database entry 352, to complete their processing. When user tasks attempt to access the database entry 352 after Task-17 370 invalidates database entry 352, the access is rejected (i.e., the user tasks are not able to access database entry 352).

Act 560 represents the update task monitoring the synchronization register 300 until all synchronization bits for the user tasks have been set to zero. Once all synchronization bits in the synchronization register 300 are set to zero, the update task updates the database entry (act 570). Then, the update task validates the database entry (e.g., sets the valid bit to one). For example, in FIG. 3D, Task-17 370 has completed its processing and has set the valid bit for database entry 352 to one. At this time, user tasks can access the database entry again.

In alternative embodiments, one of the tasks having a synchronization bit in the synchronization register 300 may be, for example, a background task that does not process multiple packets and so does not have its synchronization bit reset to zero. In these embodiments, the update task is aware of the specific one or more tasks and updates the database entry when all synchronization bits are set to zero, except for the synchronization bits of the specific tasks. In some computer systems, particular tasks are pre-designated to run as background tasks. For example, in FIG. 3E, Task-15 is a background task and has not had its synchronization bit 310G set to zero (i.e., it is one). All other user tasks have their associated synchronization bits set to zero, and Task-17 370 updates the database entry.

In some embodiments in which there are multiple micro controllers, with a separate synchronization register for each, the update task sets bits of all synchronization registers in act 540 and updates the database entry when all synchronization bits of all synchronization registers have been cleared (e.g., set to zero).

In some embodiments, hardware monitors the synchronization register 300, and, if all the synchronization bits are set to zero, generates an interrupt to the micro controller to indicate that the synchronization register 300 is clear. The micro controller can then allow a task to update a database entry. For example, the hardware may be a set of OR gates that are used to determine whether all of the synchronization bits are zero or one. If the output of the OR gates indicates that all of the synchronization bits are set to zero, then an interrupt is generated.

Figure 6:
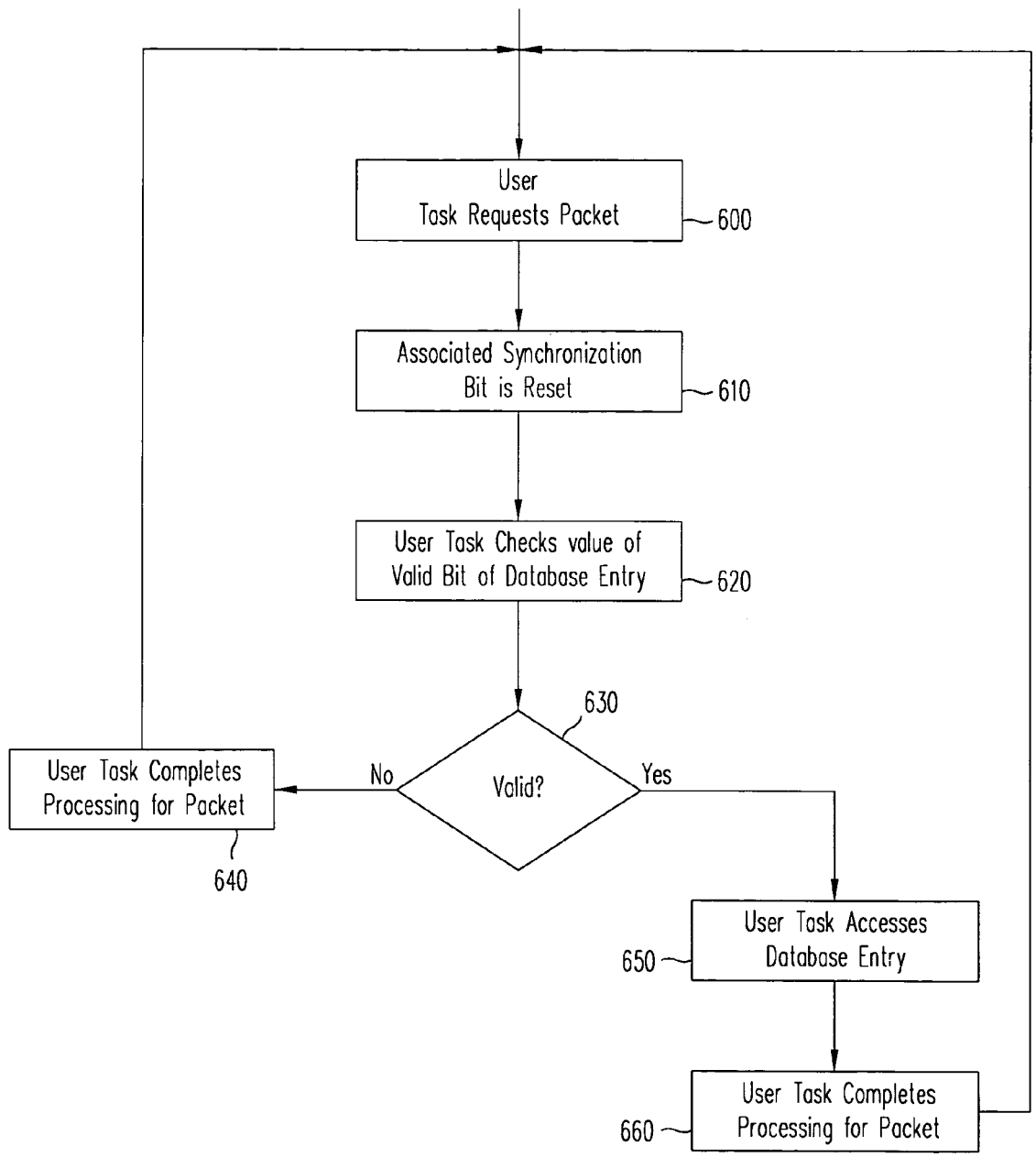
FIG. 6 illustrates, in a flow chart, acts performed by a computer programmed in accordance with some embodiments of the invention by user tasks.

FIG. 6 illustrates, in a flow chart, acts performed by a computer programmed in accordance with some embodiments of the invention by user tasks. Act 600 represents a user task requesting a packet. Act 610 represents the user task's associated synchronization bit being reset by, for example, hardware. Act 620 represents the user task checking a valid bit of a database entry. Act 630 represents the user task determining whether the valid bit is valid.

If the valid bit is valid, processing continues to act 650, otherwise, processing continues to act 640. Act 640 represents completing processing for a packet and looping back to act 600 to request another packet to process. Act 650 represents the user task accessing a database entry. Act 660 represents the user task completing processing for a packet and looping back to act 600 to request another packet to process. User tasks continue to process packets until, for example, the computer is shut down or otherwise terminates all processing.

To summarize, in some embodiments, coherent database update is allowed such that synchronization overhead is performed only by a non time-critical database update task. No synchronization overhead is performed by time critical database user tasks. In particular, one or more registers hold a bit per time critical task, and each register is referred to as a "synchronization register." The synchronization register may be read or written by a non time-critical task. Each bit is negated when a time critical task is sleeping waiting for new assignment, or when the time critical task terminates current assignment processing (and may be reactivated for new assignment). In addition each entry in the database has a valid bit. This valid bit is needed anyway for other reasons, such as existence of empty entries. All time critical tasks read the database entry and anyway must check its valid bit. The non time-critical task, wishing to update the database, should perform the following:

1. Invalidate the entry by writing valid bit=negated.
2. Assert all bits in the synchronization register by writing to it an appropriate value (e.g., 0xFFFF).
3. Poll the synchronization register and wait until all its bits are negated (e.g., all are zero).
4. Update database entry.
5. Assert database entry valid bit.

Although embodiments of the invention have been described with reference to particular embodiments, the description is only an example of the invention's applications and should not be taken as a limitation.

Additionally, some embodiments of the invention may be tangibly embodied as software in a computer-readable device or media, such as memory, data storage devices, and/or data communication devices, thereby making a product or article of manufacture according to some embodiments of the invention. As such, the terms "article of manufacture" and "computer program product" and "computer-readable storage medium" as used herein are intended to encompass software accessible from any computer readable device or media. Using the present specification, some embodiments of the invention may be implemented as a machine, process, or article of manufacture by using programming and/or engineering techniques to produce software, firmware, hardware, or any combination thereof.

Various other adaptations and combinations of features of embodiments disclosed are within the scope of the invention as defined by the following claims.

I claim:

1. A process for updating a database entry in a computer storage, the process comprising operations of:

invalidating the database entry by changing a valid indicator which indicates whether the database entry is valid, the valid indicator being changed from a value which indicates that the database entry is valid to a value which indicates that the database entry is invalid;

obtaining an indication that one or more first tasks have completed one or more first processing operations after invalidating the database entry, wherein in each first processing operation, the one or more first tasks do not access the database entry without first checking the valid indicator to ascertain that the database entry is valid, and wherein in at least one first processing operation, the one or more first tasks are operable to check the valid indicator before invalidating the database entry but to finish reading the database entry after the database entry has been invalidated in the operation of invalidating the database entry; and updating the database entry when said indication has been obtained.

2. The process of claim 1 wherein obtaining said indication comprises writing a first value to a computer storage location; and obtaining an indication that the first value has been changed to a second value in said storage location.

3. The process of claim 2 wherein the first value is changed to the second value in response to the one or more first tasks completing the one or more first processing operations.

4. The process of claim 1 wherein invalidating the valid indicator, obtaining said indication, and updating the database entry are performed by one or more second tasks.

5. The process of claim 1 wherein the one or more first tasks are a plurality of the first tasks.

6. A computer system, comprising: a memory to store software instructions; and processor to execute the software instructions to perform a process for updating a database entry, the process comprising operations of:

invalidating the database entry by changing a valid indicator which indicates whether the database entry is valid, the valid indicator being changed from a value which indicates that the database entry is valid to a value which indicates that the database entry is invalid;

obtaining an indication that one or more first tasks have completed one or more first processing operations after invalidating the database entry, wherein in each first processing operation, the one or more first tasks do not access the database entry without first checking the valid indicator to ascertain that the database entry is valid, and wherein in at least one first processing operation, the one or more first tasks are operable to check the valid indicator before invalidating the database entry but to finish reading the database entry after the database entry has been invalidated in the operation of invalidating the database entry; and updating the database entry when said indication has been obtained.

7. The system of claim 6 wherein obtaining said indication comprises: writing a first value to computer storage location; and obtaining an indication that the first value has been changed to a second value in said storage location.

8. The system of claim 7, wherein the first value is changed to the second value in response to one or more of the first tasks completing one or more of the first processing operations.

9. The system of claim 6, wherein invalidating the valid indicator, obtaining said indication, and updating the database entry is performed by one or more second tasks.

10. A computer implemented method for updating a database entry in computer storage, wherein the method comprising operations of:

invalidating the database entry by changing a valid indicator which indicates whether the database entry is valid, the valid indicator being changed from a value which indicates that the database entry is valid to a value which indicates that the database entry is invalid;

obtaining an indication that one or more first tasks have completed one or more first processing operations after invalidating the database entry, wherein in each first processing operation, the one or more first tasks do not access the database entry without first checking the valid indicator to ascertain that the database entry is valid, and wherein in at least one first processing operation, the one or more first tasks are operable to check the valid indicator before invalidating the database entry but to finish reading database entry after the database entry has been invalidated in the operation of invalidating the database entry; and updating the database entry when said indication has been obtained.

11. A computer implemented process for updating a database entry in a computer storage medium, the process comprising at least two iterations, wherein each iteration comprising operations of:

determining if the database entry is valid;
if the database entry is valid, then:
 (1) invalidating the database entry by writing a value to a valid indicator which indicates whether the database entry is valid;
 (2) obtaining an indication that one or more first tasks have completed one or more first processing operations after the operation of invalidating the database entry, wherein in each first processing operation, the one or more first tasks do not access the database entry without first checking the valid indicator to ascertain that the database entry is valid, wherein in at least one first processing operation, the one or more first tasks are operable to check the valid indicator before the operation of invalidating the database entry but to finish reading the database entry after the database entry has been invalidated;
 (3) updating the database entry when said indication has been obtained; and
if the database entry is invalid, then updating the database entry but omitting the operation of obtaining an indication and the operation of invalidating the data base entry for the database entry, wherein in at least one of the iterations establishes that the database entry associated with the at least one of the iterations is valid; and in at least another one of the iteration establishes that the database entry associated with the at least the other one of the iteration is invalid.

12. A computer program product that includes a computer readable storage medium usable by a processor, the medium having stored thereon a sequences of instructions which, when executed by said processor, causes said processor to execute a process for updating a database entry, the process comprising at least two iterations, wherein each iteration comprising operations of:

determining if the database entry is valid;
if the database entry is valid, then:
 (1) invalidating the database entry by writing a value to a valid indicator which indicates whether the database entry is valid;
 (2) obtaining an indication that one or more first tasks have completed one or more first processing operations after the operation of invalidating the database entry, wherein in each first processing operation, the one or more first tasks do not access the database entry without first checking the valid indicator to ascertain that the database entry is valid, wherein in at least one first processing operation, the one or more first tasks are operable to check the valid indicator before the operation of invalidating the database entry but to finish reading the database entry after the database entry has been invalidated;

(3) updating the database entry when said indication has been obtained; and if the database entry is invalid, then updating the database entry but omitting the operation of obtaining an indication and the operation of invalidating the data base entry for the database entry, wherein in at least one of the iterations establishes that the database entry associated with the at least one of the iterations is valid; and in at least another one of the iteration establishes that the database entry associated with the at least the other one of the iteration is invalid.

13. The computer readable storage medium of claim 12 wherein the operation of updating the database entry is accompanied by validating the database entry.

14. A method for updating a database entry in a computer storage medium, the method comprising at least two iterations, wherein each iteration comprising operations of:

determining if the database entry is valid;

if the database entry is valid, then:
(1) invalidating the database entry by writing a value to a valid indicator which indicates whether the database entry is valid;
(2) obtaining an indication that one or more first tasks have completed one or more first processing operations after the operation of invalidating the database entry, wherein in each first processing operation, the one or more first tasks do not access the database entry without first checking the valid indicator to ascertain that the database entry is valid, wherein in at least one first processing operation, the one or more first tasks are operable to check the valid indicator before the operation of invalidating the database entry but to finish reading the database entry after the database entry has been invalidated;
(3) updating the database entry when said indication has been obtained; and if the database entry is invalid, then updating the database entry but omitting the operation of obtaining an indication and the operation of invalidating the data base entry for the database entry, wherein in at least one of the iterations establishes that the database entry associated with the at least one of the iterations is valid; and in at least another one of the iteration establishes that the database entry associated with the at least the other one of the iteration is invalid.

15. The method of claim 14 wherein the operation of updating the database entry is accompanied by validating the database entry.

16. The method of claim 14 wherein each first task processes network data units, and accesses the database to process the network data units.

* * * * *